United States Patent
Zelenberg

(10) Patent No.: US 12,033,180 B2
(45) Date of Patent: Jul. 9, 2024

(54) SEMI-AUTONOMOUS ADVERTISING SYSTEMS AND METHODS

(71) Applicant: Z2 COOL COMICS LLC, New York City, NY (US)

(72) Inventor: Aleksey Zelenberg, Chicago, IL (US)

(73) Assignee: Z2 COOL COMICS LLC, New York, NY (US)

(*) Notice: Subject to any disclaimer, the term of this patent is extended or adjusted under 35 U.S.C. 154(b) by 0 days.

(21) Appl. No.: 17/358,727

(22) Filed: Jun. 25, 2021

(65) Prior Publication Data

US 2022/0414706 A1    Dec. 29, 2022

(51) Int. Cl.
*G06Q 30/0242* (2023.01)
*G06N 3/088* (2023.01)
*G06N 5/02* (2023.01)

(52) U.S. Cl.
CPC ......... *G06Q 30/0244* (2013.01); *G06N 3/088* (2013.01); *G06N 5/02* (2013.01)

(58) Field of Classification Search
CPC ........... G06Q 30/0244; G06Q 30/0242; G06Q 30/0243; G06Q 30/0246; G06Q 30/0247; G06Q 30/0249; G06Q 30/0251; G06Q 30/0254; G06Q 30/0276; G06Q 30/0277; G06N 3/088; G06N 5/02; G06N 20/00; G06N 20/20; G06N 3/045
See application file for complete search history.

(56) References Cited

U.S. PATENT DOCUMENTS

| | | | |
|---|---|---|---|
| 9,904,949 B1 * | 2/2018 | Tavernier | G06Q 30/0631 |
| 10,755,291 B1 * | 8/2020 | Sharma | G06Q 30/0201 |
| 11,127,034 B1 * | 9/2021 | Kanungo | G06Q 30/0244 |
| 11,263,532 B2 | 3/2022 | Fischerström | |

(Continued)

FOREIGN PATENT DOCUMENTS

| | | | | |
|---|---|---|---|---|
| CN | 108133391 A | * | 6/2018 | |
| CN | 109087177 A | * | 12/2018 | G06Q 30/0627 |

(Continued)

OTHER PUBLICATIONS

Liebeskind, Molly. "5 Machine Learning Techniques for Sales Forecasting." Towards Data Science, Apr. 22, 2020, https://towardsdatascience.com/5-machine-learning-techniques-for-sales-forecasting-598e4984b109. Accessed Oct. 27, 2021. (Year: 2020).*

(Continued)

*Primary Examiner* — Mehmet Yesildag
*Assistant Examiner* — Thomas Yih Ho
(74) *Attorney, Agent, or Firm* — Ferguson Case Orr Paterson

(57) ABSTRACT

Embodiments of the present disclosure provide improved methods, systems, devices, media, techniques, and processes, often computer-based and/or processor-based, for advertising to consumers, such as consumers of music-based products. In a first part of the disclosed methods and systems, potential sales of a product can be predicted. In a second part of the disclosed methods and systems, one or more regression strategies can be used to analyze data from previous products in order to produce optimized parameter values. In a third part of the disclosed methods and systems, advertisement performance can be monitored and input parameters adjusted based on that performance.

13 Claims, 2 Drawing Sheets

(56) References Cited

U.S. PATENT DOCUMENTS

| | | | |
|---|---|---|---|
| 2007/0112618 A1* | 5/2007 | Krneta | G06Q 10/04 |
| | | | 705/20 |
| 2007/0143186 A1* | 6/2007 | Apple | G06Q 30/0249 |
| | | | 705/14.48 |
| 2012/0323634 A1* | 12/2012 | Harper | G06Q 30/02 |
| | | | 705/7.31 |
| 2014/0100945 A1* | 4/2014 | Kitts | G06Q 30/0243 |
| | | | 705/14.42 |
| 2014/0278930 A1* | 9/2014 | Brixius | G06Q 30/0242 |
| | | | 705/14.45 |
| 2015/0332340 A1* | 11/2015 | Brown | G06Q 30/02 |
| | | | 705/14.66 |
| 2016/0260052 A1* | 9/2016 | Ray | G06Q 10/087 |
| 2016/0343026 A1* | 11/2016 | Cheng | G06Q 30/0251 |
| 2017/0061286 A1* | 3/2017 | Kumar | G06Q 30/0269 |
| 2017/0076321 A1* | 3/2017 | Reznek | G06Q 30/0277 |
| 2017/0124597 A1* | 5/2017 | Abraham | G06Q 30/0277 |
| 2017/0154359 A1* | 6/2017 | Zukerman | G06Q 30/0273 |
| 2017/0278113 A1* | 9/2017 | Panikkar | G06Q 30/0202 |
| 2018/0101611 A1* | 4/2018 | McDevitt | G06F 16/735 |
| 2018/0276718 A1* | 9/2018 | Thomas | G06Q 30/0244 |
| 2018/0315097 A1* | 11/2018 | Donnelly | G06Q 30/0276 |
| 2019/0251593 A1* | 8/2019 | Allouche | G06Q 10/0639 |
| 2019/0392487 A1* | 12/2019 | Duke | G06N 3/08 |
| 2020/0111069 A1* | 4/2020 | Chahal | G06Q 20/123 |
| 2020/0242639 A1* | 7/2020 | Laserson | G06Q 30/0202 |
| 2020/0410551 A1* | 12/2020 | Zhou | G06Q 30/0205 |
| 2021/0049628 A1* | 2/2021 | Baird | G06N 20/00 |
| 2021/0133782 A1* | 5/2021 | Mahajan | G06Q 30/0204 |
| 2021/0166251 A1* | 6/2021 | Mehmanpazir | G06N 20/20 |
| 2021/0201164 A1* | 7/2021 | Sghiouer | H04L 63/1416 |
| 2021/0233110 A1* | 7/2021 | Ye | G06Q 30/0273 |

FOREIGN PATENT DOCUMENTS

| | | | | |
|---|---|---|---|---|
| CN | 111724211 A | * | 9/2020 | |
| CN | 112734494 A | * | 4/2021 | |
| FR | 3094535 A1 | * | 10/2020 | G06F 18/2413 |
| KR | 20180000332 A | * | 1/2018 | |
| WO | WO-2019060325 A1 | * | 3/2019 | G06Q 20/202 |
| WO | WO-2020031315 A1 | * | 2/2020 | G06Q 50/10 |

OTHER PUBLICATIONS

Shopenova, Aigerim. "Identify Potential Customers With Unsupervised and Supervised Machine Learning." Medium, Dec. 3, 2020, https://medium.com/swlh/identify-potential-customers-with-unsupervised-and-supervised-machine-learning-5310a3455f8a. Accessed Oct. 27, 2021. (Year: 2020).*

Boyapati, Sai Nikhil, and Ramesh Mummidi. "Predicting sales using Machine Learning Techniques." (2020). (Year: 2020).*

Kauderer, Harald, and Hans-Joachim Mucha. "Supervised learning with qualitative and mixed attributes." Classification, data analysis, and data highways. Springer, Berlin, Heidelberg, 1998. 374-382. (Year: 1998).*

Buetti, Chris. "Converting Categorical Data to Numerical Data for Machine Learning—a Workaround." Level Up Coding. Mar. 16, 2020. Last accessed on Mar. 3, 2022 at https://levelup.gitconnected.com/ converting-categorical-data-to-numerical-data-for-machine-learning-a-workaround-327afacbbe84. (Year: 2020).*

Mahesh, Batta. "Machine learning algorithms—a review." International Journal of Science and Research (IJSR).[Internet] 9.1 (2020):381-386. (Year: 2020).*

* cited by examiner

SEMI-AUTONOMOUS ADVERTISING SYSTEMS AND METHODS

BACKGROUND OF THE DISCLOSURE

Field of the Disclosure

This disclosure relates generally to marketing and/or advertising. More particularly, this disclosure relates to data processing systems and methods to automate creation, modifications, and improvements to online marketing. Even more particularly, this disclosure relates to data processing systems and methods to automate creation, modification, and improvement of online marketing and/or advertisements using data from performance of previous online advertisements, such as through machine learning.

Description of the Related Art

Many businesses rely heavily on online marketing to generate interest and sales. Hiring marketing professionals is expensive and analyzing online advertising performance, researching consumer trends, and crafting well-designed advertising campaigns is time consuming.

Many businesses specifically advertise their services or goods on social media websites and online platforms. Typically, when creating advertisements, especially online advertisements, the business must make decisions on certain parameters such as advertisement objective, budget, and target audience. These and other parameters will generally determine who will see an advertisement and/or how those who viewed the advertisement will react to the advertisement. Because parameter setting is most often done by marketing professionals without automation or rigorous mathematical analysis, human error can result in less than optimal (or even disastrous) parameter settings, which in turn can result in consequences such as loss of advertisement viewership and revenue.

SUMMARY OF THE DISCLOSURE

The systems and methods of the present disclosure seek to optimize the process of advertisement parameter setting and targeted advertising through the use of machine learning and/or automation, whether by themselves or in combination with human input. This can result in both increased effectiveness of advertisements and savings on marketing costs, among other benefits.

One method according to the present disclosure for determining the viewers to which an advertisement for a current product is displayed based on data from one or more previous products includes a parameter optimization step to determine optimized parameter inputs for a plurality of parameter fields provided by an advertising host. The parameter optimization step comprises implementing a neural network utilizing parameter inputs for a first group of the parameter fields, and/or implementing a gradient boosting regressor utilizing parameter inputs for less than all of the first group of parameter fields. The parameter optimization step further includes, from said implementing of the neural network and/or the gradient boosting regressor, outputting one or more optimized parameter inputs each associated with one of the parameter fields.

One output prediction method according to the present disclosure comprises providing previous product input data including previous product predictor variable data and previous product response variable data, training an unsupervised learning algorithm using K-means clustering using the previous product predictor variable data, and training one or more supervised learning algorithms using the previous product predictor variable data and the previous product response variable data. After training the unsupervised learning algorithm, current product predictor variable data is input into the unsupervised learning algorithm. Based on the inputting of current product predictor variable data, the current product is assigned to a cluster made up of a subset of the previous products. After training the one or more supervised learning algorithms, the previous product input data of the previous products of the cluster and the current product predictor variable data are input into the one or more supervised learning algorithms. Current product predicted response variable data (e.g., sales predictions) are then output from the one or more supervised learning algorithms.

One system according to the present disclosure comprises one or more hardware computing devices having a processor and memory storing specific computer-executable instructions that, when executed by the processor, cause the system to perform a parameter optimization step to determine optimized parameter inputs for a plurality of parameter fields provided by an advertising host. The parameter optimization step comprises implementing a neural network utilizing parameter inputs for a first group of the parameter fields, and/or implementing a gradient boosting regressor utilizing parameter inputs for less than all of the first group of parameter fields. The parameter optimization step further includes, from said implementing of the neural network and/or the gradient boosting regressor, outputting one or more optimized parameter inputs each associated with one of the parameter fields.

One non-transitory machine-readable storage medium according to the present disclosure stores instructions, the execution of which in a processing system causes the processing system to perform a parameter optimization step to determine optimized parameter inputs for a plurality of parameter fields provided by an advertising host. The parameter optimization step comprises implementing a neural network utilizing parameter inputs for a first group of the parameter fields, and/or implementing a gradient boosting regressor utilizing parameter inputs for less than all of the first group of parameter fields. The parameter optimization step further includes, from said implementing of the neural network and/or the gradient boosting regressor, outputting one or more optimized parameter inputs each associated with one of the parameter fields.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other systems or methods for carrying out the same purposes of the present disclosure.

These and other further features and advantages of the disclosure would be apparent to those skilled in the art from the following detailed description, taken together with the accompanying drawings, wherein like numerals designate corresponding components or steps in the figures, in which:

DETAILED DESCRIPTION OF THE DISCLOSURE

Figure 1:
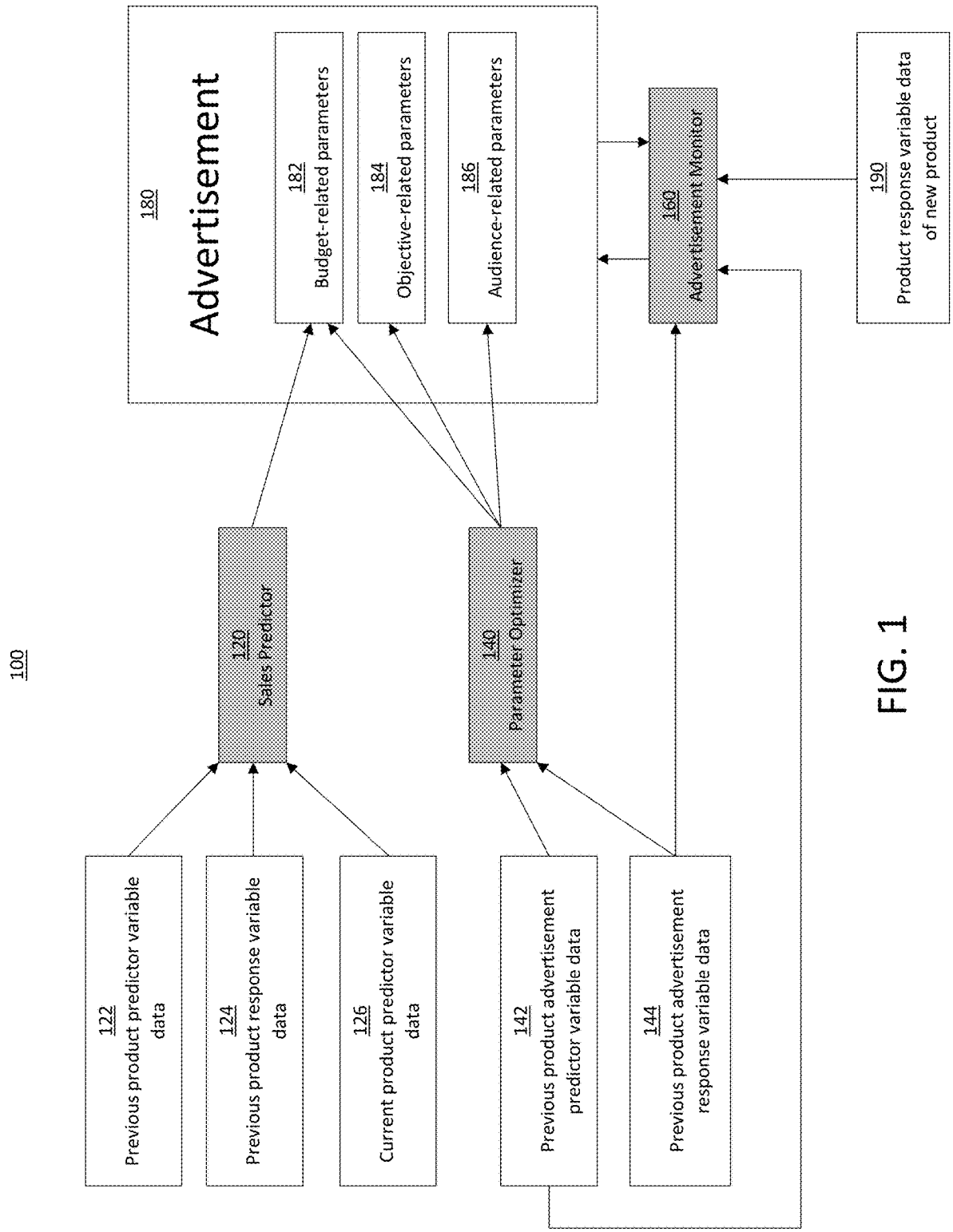
FIG. 1 is a flow chart showing an advertising improvement system according to one embodiment of the present disclosure.
Figure 2:
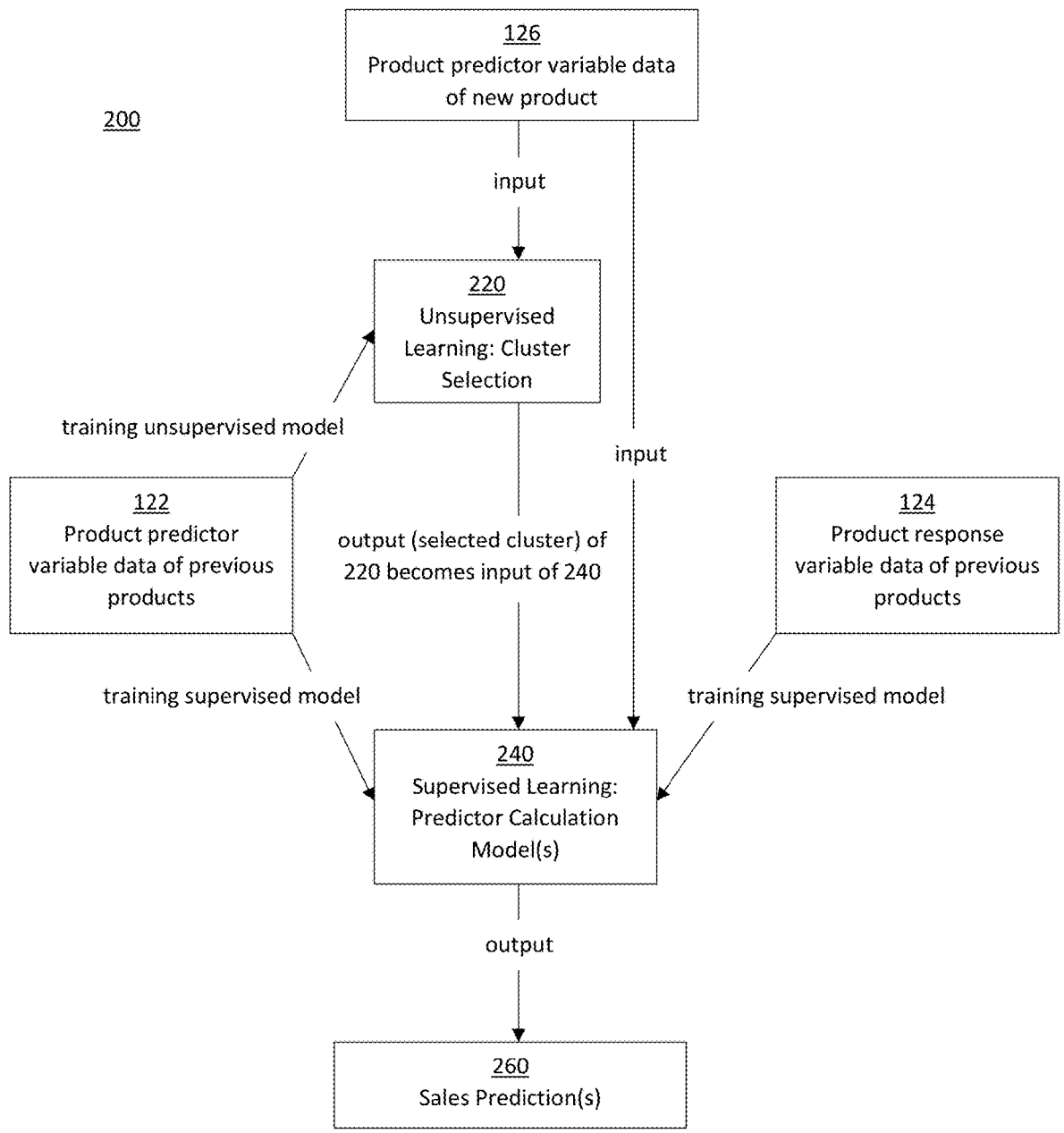
FIG. 2 is a flow chart showing a sales predictor according to one embodiment of the present disclosure.

Embodiments of the present disclosure provide improved methods, systems, techniques, and processes, often computer-based and/or processor-based, for advertising to consumers, such as consumers of music-based products.

In a first part of the disclosed methods and systems, potential sales of a product can be predicted. This can be accomplished via, for example, inputting a variety of predictor and response variable data from previous products, and variable data from a new/potential/current product (often referred to hereinafter as a "current product" for simplicity). The previous product data can be analyzed and divided into clusters (e.g., using unsupervised learning), and the current product placed into one such cluster. The previous product data can then be used to train one or more algorithms, and the current product predictor variable data input into one or more such algorithms to produce an output (e.g., predicted sales). Outputs from the trained algorithm(s) can also include predicted sales (or similar) for the previous products, and that data can be compared to actual, known outcomes (e.g. actual sales) to determine the accuracy of the algorithm(s).

In a second part of the disclosed methods and systems, one or more optimized parameter inputs (i.e., inputs for parameter fields provided by an advertising host, the inputs predicted to optimize eventual outputs, e.g., sales metrics, advertisement viewership metrics, etc.) can be determined. Predictor and response variable data of previous product advertisements can be input, and analyzed to determine how an advertisement performed versus a certain parameter or combination of parameters, and whether a relationship exists. One or more regression strategies can be used to analyze this data, providing a user with outputs that are then used to determine, and select, final parameter values. Final parameter values can be input manually or automatically through Application Programming Interfaces ("APIs"), such as that of advertising hosts like the social media platform Facebook.

In a third part of the disclosed methods and systems, advertisement performance can be monitored and input parameters adjusted based on that performance. Data related to advertisement performance (e.g., total views, total conversions, product sales, etc.) can be monitored, such as through software and/or a processor-based system. Product underperformance (e.g. of a sales metric or of an advertisement performance metric), such as underperformance past a certain threshold, can trigger a user alert, an automatic parameter adjustment, a combination thereof (e.g., an automatic parameter adjustment if a user does not take action after a certain period of time), or some other action.

The present disclosure will now set forth detailed descriptions of various embodiments. Many of the methods described below may be implemented with computer software and/or hardware, such as computers, processors, smart devices (e.g. smart phones), tablets, memory, computer readable medium, computer executable instructions, algorithms, and/or similar. The methods herein can be performed at least in part using software, software as a service (SAAS) technology, platform as a service (PAAS) technology, infrastructure as a service (IAAS) technology, and/or other technologies as would be understood by one of skill in the art. The advertisements described herein, and the components thereof, can be displayed or otherwise relayed to viewers/potential consumers, such as on a display, on a screen, on a monitor, in a verbal manner (e.g. via speaker), or otherwise.

In the description that follows, numerous details are set forth in order to provide a thorough understanding of the disclosure. It will be appreciated by those skilled in the art that variations of these specific details are possible while still achieving the results of the disclosure. Well-known elements, steps, algorithms, regression models, and processing steps are generally not described in detail in order to avoid unnecessarily obscuring the description of the disclosure.

Throughout this description, the preferred embodiments and examples illustrated should be considered as exemplars, rather than as limitations on the present disclosure. As used herein, the terms "invention," "disclosure," "method," "present invention," "present disclosure," "present method," or similar terms refer to any one of the embodiments of the disclosure described herein, and any equivalents. Furthermore, reference to various feature(s) of the "invention," "disclosure," "method," "present invention," "present disclosure," "present method," or similar terms throughout this document does not mean that all claimed embodiments or methods must include the referenced feature(s).

Additionally, various algorithms and machine learning techniques are described herein. It is understood that different algorithms and/or machine learning techniques (e.g., federated learning, Kriging, etc.) could potentially be used as would be understood by one of skill in the art, and thus fall within the scope of the present disclosure. Any specific algorithm discussed herein could potentially be replaced by another algorithm, whether currently existing or later developed, as would be understood by one of skill in the art.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

As used herein, the term "and/or" includes any and all combinations of one or more of the associated list items. The term "and" should also be able to be understood exclusively, and the term "or" understood inclusively, so as to bring within the scope of the disclosure all embodiments that would be understood by one of skill in the art.

The terminology used herein is for describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," "including," and similar terms, when used herein, specify the presence of stated features, algorithms, steps, operations, elements, and/or components, but do not preclude the presence or addition of one or more other features, algorithms, steps, operations, elements, components, and/or groups thereof.

The steps described in the below methods may be performed in different orders than those specifically described, as would be understood by one of skill in the art. Some steps may be performed simultaneously and/or continuously, as would be understood by one of skill in the art.

Numerous specific details are set forth in order to provide a more thorough understanding of embodiments incorporating features of the present disclosure. However, it will be apparent to one skilled in the art that the present disclosure can be practiced without necessarily being limited to these specifically recited details.

Embodiments of the disclosure are described herein with reference to flowcharts that are schematic illustrations of specific embodiments of the disclosure. As such, the arrangements of components or steps can be different, and variations are expected. Additionally, components and steps shown as a singular component or step may include multiple components or substeps, while aspects shown as multiple components or steps may be a singular component or performed as a singular step. Embodiments of the disclosure should not be construed as limited to the particular arrangements, components, or steps.

Furthermore, any element in a claim that does not explicitly state "means for" performing a specified function, or "step for" performing a specific function, is not to be interpreted as a "means" or "step" clause as specified in 35 U.S.C. § 112, for example, in 35 U.S.C. § 112(f) or pre-AIA 35 U.S.C. § 112, sixth paragraph.

All the features disclosed in this application may be replaced by alternative features serving the same, equivalent or similar purpose, unless expressly stated otherwise. Thus, unless expressly stated otherwise, each feature disclosed is one example only of a generic series of equivalent or similar features.

The machine learning steps and methods described herein (e.g. hyper-parameter tuning, training of supervised and unsupervised models, predictions, etc.) can be implemented using Scikit-learn and/or Keras (e.g., for neural networks). Software, systems, and methods other than Scikit-learn and Keras are possible.

Embodiments of the present disclosure provide improved automated, computer-based, and/or software-based methods, techniques, and processes for increasing the efficiency of online advertising, such as automated creation, modification, and improvements to online advertisements.

In the following description, examples of social media platforms or websites are often used, for illustrative purposes only, to explain various ways the data processing systems and methods may be implemented. However, the systems and methods described herein are not limited in applicability to social media platforms and websites, or to any other particular kind of website, platform, or application. For example, at least some of the methods described herein can be used for other suitable purposes. Additionally, the systems and methods described here are not limited to use for marketing/advertising (e.g. online marketing and/or advertising) purposes; rather, they may be employed with essentially any suitable statistical analysis based on machine data. Similarly, examples of products herein are often related to the music industry, such as music-, artist-, and/or band-based products like graphic novels or comic books. However, it should be understood that these products are only exemplary in nature.

FIG. 1 shows one embodiment of a system 100 according to the present disclosure. The system includes three primary modules or components: 1) a sales predictor 120 (also referred to as an output prediction step), 2) a parameter optimizer 140 (also referred to as a parameter optimization step), and 3) a system monitor 160. As will be discussed more fully below, each of these components can utilize one or more inputs to produce one or more outputs that can then become advertisement parameters, and/or that can be used in determining one or more advertisement parameters. It is understood that any of the components can operate separately from the others and is able to be implemented individually or as a part of another system, and that combinations of these and other components are possible.

Sales Predictor

Accurately obtaining one or more sales predictions can be beneficial to the eventual setting of advertising parameters. These sales predictions, an output of the sales predictor 120, can then be used as an input in determining optimized advertisement parameters, such as overall budget, either directly (as shown by the 120-182 arrow in FIG. 1) and/or using the parameter optimizer 140 (as shown by the 140-182 arrow in FIG. 1). It is understood that while the specific example of a sales predictor (also referred to as a sales prediction step, output predictor, and/or output prediction step) 120 producing sales predictions is described herein, this could be applied to outputs other than sales, and thus also be termed an output predictor/output prediction step producing output predictions.

Example Input Parameters

Any number of inputs can be used to predict sales. For instance, in the context of goods or services related to musical artists (e.g., books or comic books related to musicians, bands, songs, etc.), inputs could include, by way of example only, 1) Deezer fan count, 2) Instagram follower count, 3) Pandora lifetime stations count, 4) Pandora lifetime streams count, 5) Spotify follower count, 6) Spotify popularity rating, 7) TikTok follower count, 8) TikTok likes count, 9) YouTube subscriber count, 10) YouTube videos viewed count, 11) Twitter follower count, 12) Twitter engagement, 13) Reddit subscriber count, 14) Reddit engagement, 15) concert sales, 16) album sales, 17) radio chart data, 18) artist age, 19) audience age, 20) audience gender breakdown, 21) artist genre, and/or 21) various other inputs. It is understood that other inputs are possible. Example outputs could include, for instance, overall predicted revenue, first-week predicted revenue, total items sold, and type/version of each product sold (e.g., standard versus deluxe version).

Input data (e.g., previous product predictor variable data 122, which will be discussed in more detail below) can be pulled from a number of different resources. For instance, this data can be pulled from Application Programming Interfaces ("APIs"). Examples of potential APIs from which data can be gathered, whether open source or subscription-based, include APIs from Chartmetric, Spotify, Twitter, Reddit, Songkick, Setlist, and Ticketmaster. In addition to traditional numerical data such as, for example, the number of followers a certain artist has, or the number of plays a certain song has, this data could include information regarding or derived from how a user physically reacts and/or scrolls/swipes (e.g., when the user sees an ad for an artist), whether the user engages with such an ad (e.g. via clicking/tapping, following a link, etc.), and other similar analysis.

Predictor variable data (e.g. previous product predictor variable data 122 and/or current product predictor variable data 126) is often based on and/or derived from physical, real-world actions (e.g. actions taken by an artist and/or actions taken by consumers), whether directly or indirectly (e.g., placement on a "chart" is often related to the number of times a song has been played on the radio, or number of times an album has been bought). Some examples include (a) the number of times a song, artist, album, etc. has been played (e.g., on a certain platform such as Pandora or Spotify, on the radio, etc.), (b) the number of times a song, artist, album, etc., and/or associated social media posts, have been played, "liked," "followed," "forwarded" (e.g. "retweeted"), etc. on a social media platform, such as via clicking or tapping a "like" button, (c) attendance at concerts, (d) purchases of other products associated with a certain song/artist/album/etc., (e) an artist's interaction with social media (e.g. number of social media posts), and other similar examples.

Pre-Prediction Phase

In order to develop the sales predictor, certain "pre-prediction" steps can be taken. The pre-prediction phase can include, for example, data analytics (e.g., summary statistic production and correlation analysis), data wrangling, training of the unsupervised learning/model selection step 220, and training of the supervised learning/predictor calculation step 240.

For example, a pre-prediction analytics step can first be performed in which summary statistics are generated and correlations (if any) are found. These summary statistics could partially or wholly be generated from, for example, previous product input data including previous product predictor variable data 122 (which could correspond to the above-listed inputs) and previous product response variable data 124 (which could correspond to the above-listed outputs, such as revenue and sales numbers), which can be supplied by the user. The pre-prediction step can also include finding correlations between the predictor variable data and the response variable data. For instance, each input can be compared to each output to determine whether there is a statistically significant input/output correlation. This could be done using, for example, a linear correlation coefficient such as a Pearson correlation coefficient for each input/output pair. While linearity is not necessarily required for a correlation to exist (e.g., a logarithmic, exponential, polynomial, or quadratic correlation could exist), generally determining whether a linear correlation exists can be a valuable initial step and show the most obvious correlations. For instance, testing these input/output pairs could reveal a highly linear relationship between artist concert sales and product sales, meaning that products associated with artists with low concert sales may not be as desirable. This step could be used either by itself or in conjunction with other methods to determine what variables play a statistically significant and/or meaningful role in determining output, and/or what input variables will be used by the sales predictor 120.

In one specific embodiment, one or more inputs that show a correlation (e.g., linear, logarithmic, exponential, polynomial, quadratic, etc.) to one or more outputs are used in a sales prediction determination. In another specific embodiment, one or more inputs that show a linear correlation to one or more outputs are used in a sales prediction determination. In another specific embodiment, all inputs that show one or more of a subset of types of correlations (e.g., a subset from linear, logarithmic, exponential, polynomial, and quadratic) are used in a sales prediction determination. In another specific embodiment, all inputs that show a linear correlation to one or more outputs are used in a sales prediction determination. In all examples, these input sets can be closed (i.e. no additional inputs are used) or open (i.e. other additional inputs may be used).

After the analytics step, a wrangling step can be performed. In this step, numerical data can be standardized, missing values imputed, and outliers removed. Other wrangling steps as known in the art can also be performed. It is understood that the wrangling step could also be performed prior to the analytics step, elsewhere in the process, or not at all.

After the wrangling step, the unsupervised learning: cluster selection step 220 can be trained, A goal of the step 220 can be to assign a new product to a cluster of previous products with one or more similar characteristics (e.g. musical genre of the artist, years when the artist primarily performed, solo artists versus bands, etc.). Typically the output will be a single cluster of multiple previous products/artists, though it is understood that in other embodiments, multiple clusters could be output. Training of the step 220 should be performed prior to current product predictor variable data 126 being run through this step.

One specific manner of accomplishing cluster assignment training is using unsupervised learning, such as a K-means clustering algorithm. In this method, a processor (e.g., a computer processor) is given data from previous products and instructed to form K number of clusters of related products (i.e., is trained using this data). The training inputs for this step can include qualitative and/or quantitative characteristics of each product. Training inputs can include previous product predictor variable data 122 such as, for example, artist musical genre, years of primary performance, whether the artist is a solo artist or a band, fan demographics, social media presence, any of the previously-described inputs, or other data. It is understood that other variables are possible.

Next, the supervised learning/predictor calculation step 240 can be trained, resulting in a single model or multiple models (in the specific embodiment described herein, multiple models: one for each algorithm/predictor combination). One or more algorithms can each be trained using one or more inputs in order to determine the best inputs for prediction for the chosen cluster. Example algorithms for this step include multiple linear regression algorithms (e.g. multiple linear regression with regularization, such as elastic-net regularization); gradient boosting regression algorithms (e.g. gradient boosting regression with a decision-tree base regressor); and random forest regression algorithms (e.g. random forest regression with bootstrapping). It is understood that other types of algorithms are possible. Inputs can be tested as single inputs, combinations of two inputs, combinations of three inputs, combinations of four inputs, combinations of five or more inputs, and/or combinations of all inputs. In one embodiment, the algorithms do not talk to each other, which can help to avoid over-engineering and overfitting, though it is understood that in other embodiments an ensemble learning model could be used.

Hyper-parameters for one or both of the unsupervised learning: cluster selection step 220 and the supervised learning: predictor calculation model(s) step 240 can be tuned using a grid search (e.g., for a small number of hyper-parameters such as 5 or less, 10 or less, 20 or less, 50 or less) to obtain more accurate results, and/or a randomized search (e.g. for a large number of hyper-parameters such as 100 or more) to cut down on processing time. Training of one or both of the unsupervised learning: cluster selection step 220 and the supervised learning: predictor calculation model(s) step 240 can be implemented using Scikit-learn and/or other software/platforms/etc. Categorical parameters (e.g. campaign objective) can be converted to quantitative parameters, such as by using label and one-hot encoding, or converting qualitative parameters to binary parameters, both with regard to these specific steps and other systems, steps, and methods described in this disclosure.

Prediction Phase

After the pre-prediction phase, current product predictor variable data 126 can be used in a prediction phase. First, the data 126 can be input through the cluster selection step 220, and the new product assigned to a cluster of old products/artists. As with all steps described herein, the cluster selection step 220 can be run iteratively for each new product.

Cluster information, as an output of the unsupervised learning: cluster selection step 220, can then be input into the supervised learning: predictor calculation model(s) step 240, along with the current product predictor variable data 126. This cluster information can include previous product predictor variable data 122 for each of the artists/products in the specified cluster. It is understood that the data 126 could be provided directly to the step 240 (as shown), or could be provided as part of the output from the cluster selection step 220 (e.g., if the cluster information includes information from both old artists/products and the new artist/product).

In the step 240, these inputs are then run through the algorithm/predictor combination(s) of the chosen cluster, resulting in predicted current product response variable data (sales predictions 260) for the current product predictor variable data 126, for the new product/artist (for simplicity referred to herein as "sales predictions 260" since this data often refers to sales metrics, though it is understood that predictions for other types of metrics can also be output). The sales predictions 260 for the new product can then be used to inform user decisions, and/or as an input in other modules or components.

In determining a sales prediction 260 for the new product based on the step 240, additional information can also be used. For instance, the results of the pre-prediction analytics step described above can be compared to the results of the step 240. This comparison can determine if, for example, the model of the step 240 is overfitting and producing erroneous results. By way of example, if the pre-prediction analytics step shows no correlation between a predictor variable and response variable, but a random forest regressor trained on that predictor variable produces a high $R^2$ value (e.g., 0.95), this would be an example of inconsistent results. This could be the result of, for instance, the model strongly overfitting (which would make sense given the lack of correlation from the pre-prediction analytics step), or the existence of a highly complex relationship that had not been encapsulated in any of the results from that step. If a user determines that it is the result of the overfitting, then the model with the overfitting can be omitted (or have its influence reduced) in calculating the sales prediction 260. Alternatively or in addition, the user can explore the possibility of a more complicated relationship that was not picked up by the pre-prediction analytics step.

In one embodiment, sales predictions 260 for old products/artists from the cluster (i.e., predicted response variable data for the previous product predictor variable data 122) can also be produced. The sales predictions 260 for old products can be compared to the actual known data, such as the previous product response variable data 124 for the selected artists/products. This comparison can be performed to determine the best-performing algorithm/predictor combination(s) using, e.g., the smallest number of errors for products within the cluster for each algorithm (or a cluster subset such as genre-matching products within the cluster), the largest $R^2$ value for the cluster for each algorithm (or a cluster subset such as genre-matching products), the smallest total error for the cluster (or a cluster subset such as genre-matching products within the cluster) for each algorithm, and/or in other manners. The sales prediction 260 using this best-performing algorithm/predictor(s) set (or multiple such sets) and the current product predictor variable data 126 can then be used as (or to produce) a final sales prediction.

It is understood that actual users of the system may want to study numerous data points, and as such narrowing to a single algorithm and/or predictor subset may not be necessary. For instance, a user may want to see all algorithm outputs for the best predictor subsets; the top five predictor subsets for the best-performing algorithm; the top five predictor subsets for all three algorithms; some combination of the various outputs; etc.

Parameter Optimizer

Advertisement hosts (e.g., social media platforms such as Facebook, Twitter, etc.) often provide interfaces for advertisers in which the advertiser inputs information for various parameter fields, often pre-determined by the advertisement host, to determine how that advertiser's ads are transmitted to users, such as on a display, on a screen, on a monitor, in a verbal manner (e.g. via speaker), or otherwise. One goal of the present disclosure is to provide systems and methods to optimize these inputs/settings for these parameters in order to meet a user's goals (e.g., highest product profit).

Some examples of parameters that can potentially be optimized are described below. These specific examples are listed and classified based on those available via the social media network Facebook in order to provide a real-world example. However, it should be understood that while the below example parameters are listed and categorized using Facebook's advertising parameters and hierarchy, the present disclosure and its methods, concepts, and systems are not limited to those parameters and hierarchy.

Facebook uses an advertising hierarchy in which an "advertisement" is made up of "campaigns," each campaign is made up of "ad-sets," and each ad-set is made up of "ads." Example advertising parameters include:

Campaign level: campaign objective (e.g. conversions, traffic, engagement, brand awareness, etc.); budget optimization (e.g. daily budget, lifetime budget, bid strategy).

Ad-set level: budget (e.g. spending limits), schedule (e.g. start/end dates); desired custom audience (e.g. a specific target consumer, such as those who previously purchased a related product, such as another product associated with a certain musician or band); geographic location; demographic targeting (e.g. geographic location, age, gender, language, interests, favorite musical genre, whether viewer has recently taken a vacation).

Ad level: color (e.g. average RGB value of ad, most predominant color in ad); presence of human(s) in ad.

It is understood that the above parameters are only exemplary in nature, and could also be allocated differently in a hierarchical structure; and that no hierarchical structure such as that described above is necessary for operation of systems and methods according to the present disclosure.

One goal of the parameter optimizer 140 is to determine the set of parameter values that is predicted to yield a result closest to the result desired by the user and/or predicts the highest or lowest output for a certain metric (e.g., "highest total revenue"). Methods and systems according to the present disclosure can utilize machine learning in order to predict optimal parameters. In a parameter optimizer 140 according to the present disclosure, two or more different strategies can be used. It is understood that either of these strategies could be used alone, with one another, and/or in conjunction with different strategies.

In a first strategy, a neural network (e.g., a regression-based neural network such as a regression-based neural network implemented using Keras) can be utilized. The neural network can be trained using, for example, 1) previous product advertisement predictor variable data 142 (e.g., the parameter values for previous products), and 2) previous product advertisement response variable data 144 (e.g. overall revenue, first-week revenue, total items sold, type/version of each product sold, number of viewers/consumers reached by the advertisement, number of conversions, traffic, engagement, traffic to user website, brand awareness, etc.).

In the first strategy, all, substantially all, and/or a set of previous products can be used. The large amount of data available allows for the use of all (or nearly all, such as 90% or more, 80% or more, 50% or more) parameters that are amenable to machine learning (which could itself be a subset of all modifiable parameters, such as 25% or more, 40% or more, 50% or more, 65% or more, 75% or more, or 90% or more of modifiable parameters), and can allow the neural network approach to have sufficient accuracy. It is understood, however, that other embodiments (e.g., where a gradient boosting regressor is used instead) are possible.

After training of the model (e.g., neural network), the prediction phase can take place. A primary goal of the prediction phase is to identify the parameter combination that the neural network predicts will yield the result closest to the result desired by the user (e.g., highest return on investment). Thus, inputs for the prediction phase include various parameter combinations (e.g., one hundred or more, one thousand or more, one hundred thousand or more, one million or more, ten million or more, one hundred million or more, one billion or more, etc., parameter combinations), and outputs for the prediction phase can include a predicted result or results for the associated parameter combination input. The best-performing parameter combination(s) can then be identified.

In a second strategy, a subset of the parameters described above as being used in the first strategy (either using the same parameters as the first strategy or a subset of less than all of those parameters) can be used. This subset can be determined manually based on, for example, the objective of the campaign being run (e.g., if the campaign's goal is a large number of conversions then a first group of parameters may be more applicable, whereas if the goal is a large number of views then a second group of parameters may be more applicable). In one specific embodiment, one or more parameter field values are fixed. By way of example only, a user may have determined that for business purposes, the advertisement should be optimized for consumers in the northeastern United States. As such, a geographic location parameter could be fixed to target the northeastern United States, and the remaining parameters subject to the machine learning strategy.

Non-limiting, exemplary embodiments of the present disclosure include systems and methods where one parameter is fixed, at least one parameter is fixed, two or more parameters are fixed, three or more parameters are fixed, a plurality of parameters are fixed, less than 50% of available/modifiable parameters are fixed, less than 25% of available/modifiable parameters are fixed, and/or less than 10% of available/modifiable parameters are fixed. It is understood that other embodiments are possible.

Other methods of determining the subset are possible. For instance, in one specific embodiment, one or more parameters corresponding to inputs that showed a correlation (e.g., linear, logarithmic, exponential, polynomial, quadratic, etc.) to one or more outputs are used. In another specific embodiment, one or more parameters corresponding to inputs that showed a linear correlation to one or more outputs are used. In another specific embodiment, all parameters corresponding to inputs that showed one or more of a subset of types of correlations (e.g., a subset from linear, logarithmic, exponential, polynomial, and quadratic) are used in a sales prediction determination. In another specific embodiment, all parameters corresponding to inputs that showed a linear correlation to one or more outputs are used in a sales prediction determination. In all examples, these parameter sets can be closed (i.e. no additional parameters are used) or open (i.e. other additional parameters may be used). These parameters could be selected based on the previously described pre-prediction analytics step used in the sales predictor 120.

In the second strategy, a smaller number of training inputs may be used compared to the first strategy. For instance, the training inputs can include data (e.g., previous product advertisement predictor variable data 142 and previous product advertisement response variable data 144) only from previous products with parameter values that match the second strategy fixed parameter values. Thus, the products used in the second strategy may be a subset of the set of products used in the first strategy, and/or include fewer products and/or less data than the first strategy.

The second strategy can utilize a gradient boosting regressor instead of a neural network like the first strategy. The use of a gradient boosting regressor can be beneficial due to the smaller amount of data being used to train the model. It is understood that other embodiments (e.g., where a neural network is used) are possible.

Similar to the first strategy, after the gradient boosting regressor is trained, inputs for the prediction phase include various parameter combinations (e.g., one hundred or more, one thousand or more, one hundred thousand or more, one million or more, ten million or more, one hundred million or more, one billion or more, etc., parameter combinations), and outputs for the prediction phase can include a predicted result or results for the associated parameter combination input. The best-performing parameter combination(s) can then be identified.

The use of the first strategy, the second strategy, or both, whether by themselves or in combination with one another and/or other strategies, can be determined based on the amount of data available. In order to avoid overfitting, the amount of data available (e.g., from previous products) can be used to determine the type of model used. For instance, the second strategy could be run using a neural network if enough previous products utilized the same parameter value(s) as the fixed value(s), meaning that more data would be available. Combinations of the various strategies and models are possible and envisioned.

The first strategy and/or the second strategy can output one or more optimized parameter combinations (i.e., values for parameter fields provided by an advertising host, the values predicted to optimize eventual outputs, e.g., sales metrics, advertisement viewership metrics, etc.). Finally, a set of advertisement parameters can be determined with the optimized parameter combination(s) used (at least in part) to determine final parameter values, such as, e.g., values for objective-related parameters 184 and/or audience-related parameters 186, and/or in certain instances budget-related parameters 182. To make this final determination, a user can consider optimized parameter combinations from both the first and second strategies (or only one strategy, or three or more strategies), output from the sales predictor, and/or other user-defined goals. For instance, in one embodiment, the optimized parameter combination/values from the first strategy is/are input. In another embodiment, the optimized parameter combination/values from the second strategy is/are input. In another embodiment, the fixed parameter values from the second strategy are used while the optimized parameter values from the first strategy are used for non-fixed parameters. In one embodiment, one or more of the optimized parameter inputs, or other values determined based on the optimized parameter inputs, can be input into parameter fields provided by an advertising host.

This final process can also be automated. Once the advertisement parameters (e.g., optimized parameter inputs) are determined, they can be input (e.g., in an advertising host such as that used by Facebook) manually or in an automated manner (e.g., using a computer program that interacts with the advertisement host such as via the advertisement host's API, e.g., Facebook's marketing API). Additionally, parameters not amenable to machine learning (e.g., whether an advertisement is running or dormant) can also be automated. The advertising host will then run the advertisement (including specific ads) according to the parameter inputs (or not run the advertisement if, for example, the advertisement's status is set to dormant), such as by displaying ads via a display, on a screen, on a monitor, in a verbal manner (e.g. via speaker), or otherwise, to users selected based on the advertisement parameters.

Advertisement Monitor

The third primary module/component of the system 100 is the advertisement monitor 160. The advertisement monitor can receive inputs from the user such as product response variable data of new product 190 (e.g., revenue, website traffic, etc., such as data from an online store); advertisement output data from the advertisement host (e.g. advertisement views, clicks, etc.); data from previous products such as data 142 and/or data 144; data from the sales predictor 120 (not shown in FIG. 1); and/or data from the parameter optimizer 140 (not shown in FIG. 1), such as, for example, the predicted output metrics for the parameter combination that was eventually used for the current product. Underperformance of a selected metric (e.g., ROI, sales, impressions, reach, posts, website traffic, etc.) can trigger action, such as an alert being sent to selected employees, and/or recommendations for parameter modification being sent to selected employees. The underperformance alert and/or action can be triggered if underperformance is past a certain threshold (e.g., <90% of expected metric value, <75% of expected metric value, <65% of expected metric value, <50% of expected metric value, etc.).

The recommendations can in some embodiments be based on previous products that underperformed in a similar manner and/or in which parameter adjustments were made. In one embodiment, the most recommended parameter adjustment can be implemented automatically, such as immediately upon underperformance being detected, or after a certain period of time has passed without action from the user (e.g. six hours, 12 hours, one day, three days, a week, etc.).

The above description has focused on current products (and associated data, outputs, etc.) and previous products (and associated data, outputs, etc.). It is understood that a current product (and associated data, outputs, etc.) can later be used as one of the previous products, for future "current products." For instance, if 100 previous products exist, the 101st product could be considered the "current product"; and for the 102nd product, the 101st product could be reclassified as a "previous product."

It is understood that embodiments presented herein are meant to be exemplary. Embodiments of the present disclosure can comprise any combination of compatible features and steps, and these embodiments should not be limited to those expressly illustrated and discussed. For instance and not by way of limitation, the appended claims could be modified to be multiple dependent claims so as to combine any combinable combination of elements within a claim set, or from differing claim sets. Claims depending on one independent claim (e.g., claim 1) could be modified so as to depend from a different independent claim (e.g., claim 20), and one type of independent claim (e.g., a method claim like claim 20) could be modified to be a system or medium claim. Although the present disclosure has been described in detail with reference to certain preferred configurations thereof, other versions are possible. Therefore, the spirit and scope of the disclosure should not be limited to the specific versions described above.

While the foregoing written description of the disclosure enables one of ordinary skill to make and use what is considered presently to be the best mode thereof, those of ordinary skill will understand and appreciate the existence of variations, combinations, and equivalents of the specific embodiments, methods, systems, and examples herein. The disclosure should therefore not be limited by the above described embodiments, methods, systems, and examples. Furthermore, certain terminology has been used for the purposes of descriptive clarity, and not to limit the present disclosure. It is therefore intended that the following appended claims include all such alterations, modifications and permutations as fall within the true spirit and scope of the present disclosure. No portion of the disclosure is intended, expressly or implicitly, to be dedicated to the public domain if not set forth in the claims.

I claim:

1. An advertising and sales prediction method, comprising:
    initializing communications with an advertising host and receiving a plurality of parameter fields from said advertising host;
    performing a parameter optimization step to determine optimized parameter inputs for said plurality of parameter fields said parameter optimization step comprising:
        implementing a neural network utilizing parameter inputs for a first group of said parameter fields;
        implementing a gradient boosting regressor utilizing parameter inputs for a second group of said parameter fields, wherein said second group of said parameter fields is a subset of and less than all of said first group of said parameter fields; and
        from said implementing a neural network and said implementing a gradient boosting regressor, outputting one or more optimized parameter inputs each associated with one of said parameter fields;
    performing an output prediction step, said output prediction step comprising:
        for a plurality of previous products, providing previous product input data, said previous product input data comprising previous product predictor variable data and previous product response variable data, said previous product response variable data comprising sales data for each of said previous products;
        training an unsupervised machine learning algorithm using K-means clustering using said previous product predictor variable data;
        training one or more supervised machine learning algorithms using said previous product predictor variable data and said previous product response variable data including at least some of said sales data;
        after training said unsupervised machine learning algorithm, inputting current product predictor variable data to said unsupervised learning algorithm;

based on said inputting current product predictor variable data, assigning said current product to a cluster, said cluster made up of a subset of said previous products;

after training said one or more supervised machine learning algorithms, inputting the previous product input data of the previous products of said cluster including at least some of said sales data of the previous products of said cluster, and inputting said current product predictor variable data, to said one or more supervised machine learning algorithms; and outputting one or more sales predictions from said one or more supervised machine learning algorithms, said one or more sales predictions comprising one or more current product sales predictions, wherein one of said parameter fields is an advertising budget field, and further comprising an advertising budget input to said advertising budget field, said advertising budget input determined using said one or more current product sales predictions; and automatically inputting said one or more optimized parameter inputs into their corresponding parameter fields via the advertising host, wherein said inputting said one or more optimized parameter inputs into their corresponding parameter fields, by itself or in conjunction with other actions, causes said advertising host to transmit an advertisement to a plurality of viewers selected based at least in part on said optimized parameter inputs;

an advertisement monitor step, said advertisement monitor step comprising:
receiving current product response variable data;
receiving advertisement output data;
comparing said current product response variable data to said one or more current product sales predictions; and
if the comparison of said current product response variable data to said one or more current product sales predictions indicates that the current product is underperforming, automatically adjusting said one or more optimized parameter inputs via the advertising host; and wherein said method is performed automatically and iteratively via the advertising host by determining said current product response variable data, and using said current product predictor variable data and said current product response variable data as previous product input data in each successive iteration for further training said one or more supervised machine learning algorithms and said one or more unsupervised machine learning algorithms.

2. The method of claim 1, wherein said parameter inputs for said second group of said parameter fields when implementing said gradient boosting regressor comprises at least one parameter input that has a fixed value selected by a user.

3. The method of claim 1, wherein said one or more optimized parameter inputs are output from said implementing a neural network and said implementing a gradient boosting regressor.

4. The method of claim 1, further comprising determining from said previous product input data which parameter fields show a correlation to one or more selected outputs, and wherein said second group of said parameter fields includes only parameter fields that showed a correlation to said one or more selected outputs.

5. The method of claim 4, wherein said determining comprises determining from said previous product input data which parameter fields show a linear correlation to said one or more selected outputs, and wherein said second group of said parameter fields includes only parameter fields that showed a linear correlation to said one or more selected outputs.

6. The method of claim 1, wherein said previous product predictor variable data comprises one or more categorical or qualitative parameters that are converted to quantitative parameters before training said unsupervised learning algorithm and before training said one or more supervised learning algorithms, and wherein said current product predictor variable data comprises one or more categorical or qualitative parameters that are converted to quantitative parameters prior to said inputting current product predictor variable data to said unsupervised learning algorithm, and prior to said inputting said current product predictor variable data to said one or more supervised learning algorithms.

7. The method of claim 1, wherein said one or more sales predictions further comprises one or more previous product sales predictions.

8. The method of claim 7, wherein said one or more supervised learning algorithms is a plurality of supervised learning algorithms, and further comprising comparing said previous product sales predictions to said previous product response variable data and, based on said comparison, determining which of said one or more supervised learning algorithms performed best.

9. The method of claim 1, wherein said one or more supervised learning algorithms comprise a multiple linear regression algorithm, a gradient boosting regression algorithm, and a random forest regression algorithm.

10. The method of claim 1, wherein said budget input is one of said optimized parameter inputs.

11. The method of claim 1, further comprising alerting a user of the underperformance.

12. A system configured to perform a method comprising the steps of:
initializing communications with an advertising host and receiving a plurality of parameter fields from said advertising host;
performing a parameter optimization step to determine optimized parameter inputs for said plurality of parameter fields said parameter optimization step comprising:
implementing a neural network utilizing parameter inputs for a first group of said parameter fields;
implementing a gradient boosting regressor utilizing parameter inputs for a second group of said parameter fields, wherein said second group of said parameter fields is a subset of and less than all of said first group of said parameter fields; and
from said implementing a neural network and said implementing a gradient boosting regressor, outputting one or more optimized parameter inputs each associated with one of said parameter fields;
performing an output prediction step, said output prediction step comprising:
for a plurality of previous products, providing previous product input data, said previous product input data comprising previous product predictor variable data and previous product response variable data, said previous product response variable data comprising sales data for each of said previous products;
training an unsupervised machine learning algorithm using K-means clustering using said previous product predictor variable data;
training one or more supervised machine learning algorithms using said previous product predictor variable data and said previous product response variable data including at least some of said sales data;

after training said unsupervised machine learning algorithm, inputting current product predictor variable data to said unsupervised learning algorithm;

based on said inputting current product predictor variable data, assigning said current product to a cluster, said cluster made up of a subset of said previous products;

after training said one or more supervised machine learning algorithms, inputting the previous product input data of the previous products of said cluster including at least some of said sales data of the previous products of said cluster, and inputting said current product predictor variable data, to said one or more supervised machine learning algorithms; and outputting one or more sales predictions from said one or more supervised machine learning algorithms, said one or more sales predictions comprising one or more current product sales predictions, wherein one of said parameter fields is an advertising budget field, and further comprising an advertising budget input to said advertising budget field, said advertising budget input determined using said one or more current product sales predictions; and automatically inputting said one or more optimized parameter inputs into their corresponding parameter fields via the advertising host, wherein said inputting said one or more optimized parameter inputs into their corresponding parameter fields, by itself or in conjunction with other actions, causes said advertising host to transmit an advertisement to a plurality of viewers selected based at least in part on said optimized parameter inputs;

an advertisement monitor step, said advertisement monitor step comprising:

receiving current product response variable data;

receiving advertisement output data;

comparing said current product response variable data to said one or more current product sales predictions; and if the comparison of said current product response variable data to said one or more current product sales predictions indicates that the current product is underperforming, automatically adjusting said one or more optimized parameter inputs via the advertising host; and wherein said method is performed automatically and iteratively via the advertising host by determining said current product response variable data, and using said current product predictor variable data and said current product response variable data as previous product input data in each successive iteration for further training said one or more supervised machine learning algorithms and said one or more unsupervised machine learning algorithms.

13. A non-transitory machine-readable storage medium that stores computer instructions that, when executed by at least one processor, cause the at least one processor to perform the steps of:

initializing communications with an advertising host and receiving a plurality of parameter fields from said advertising host;

performing a parameter optimization step to determine optimized parameter inputs for said plurality of parameter fields said parameter optimization step comprising:

implementing a neural network utilizing parameter inputs for a first group of said parameter fields;

implementing a gradient boosting regressor utilizing parameter inputs for a second group of said parameter fields, wherein said second group of said parameter fields is a subset of and less than all of said first group of said parameter fields; and from said implementing a neural network and said implementing a gradient boosting regressor, outputting one or more optimized parameter inputs each associated with one of said parameter fields;

performing an output prediction step, said output prediction step comprising:

for a plurality of previous products, providing previous product input data, said previous product input data comprising previous product predictor variable data and previous product response variable data, said previous product response variable data comprising sales data for each of said previous products;

training an unsupervised machine learning algorithm using K-means clustering using said previous product predictor variable data;

training one or more supervised machine learning algorithms using said previous product predictor variable data and said previous product response variable data including at least some of said sales data;

after training said unsupervised machine learning algorithm, inputting current product predictor variable data to said unsupervised learning algorithm;

based on said inputting current product predictor variable data, assigning said current product to a cluster, said cluster made up of a subset of said previous products;

after training said one or more supervised machine learning algorithms, inputting the previous product input data of the previous products of said cluster including at least some of said sales data of the previous products of said cluster, and inputting said current product predictor variable data, to said one or more supervised machine learning algorithms; and outputting one or more sales predictions from said one or more supervised machine learning algorithms, said one or more sales predictions comprising one or more current product sales predictions, wherein one of said parameter fields is an advertising budget field, and further comprising an advertising budget input to said advertising budget field, said advertising budget input determined using said one or more current product sales predictions; and automatically inputting said one or more optimized parameter inputs into their corresponding parameter fields via the advertising host, wherein said inputting said one or more optimized parameter inputs into their corresponding parameter fields, by itself or in conjunction with other actions, causes said advertising host to transmit an advertisement to a plurality of viewers selected based at least in part on said optimized parameter inputs;

an advertisement monitor step, said advertisement monitor step comprising:

receiving current product response variable data;

receiving advertisement output data;

comparing said current product response variable data to said one or more current product sales predictions; and if the comparison of said current product response variable data to said one or more current product sales predictions indicates that the current product is underperforming, automatically adjusting said one or more optimized parameter inputs via the advertising host; and wherein said method is performed automatically and iteratively via the advertising host by determining said current product response variable data, and using said current product predictor variable data and said current product response variable data as previous product input data in each successive iteration for further training said one or more supervised machine learning algorithms and said one or more unsupervised machine learning algorithms.

* * * * *